(12) United States Patent
Chou et al.

(10) Patent No.: US 8,320,081 B2
(45) Date of Patent: Nov. 27, 2012

(54) MAGNETIC RECORDING HEAD, HEAD GIMBAL ASSEMBLY, AND DISK DRIVE UNIT WITH THE SAME

(75) Inventors: Shenkuang Chou, Hong Kong (CN); Liping Peng, DongGuan (CN); Kayip Wong, Hong Kong (CN); Yanbin Wang, DongGuan (CN); Lu Xiao, DongGuan (CN); Bin Zhao, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 317 days.

(21) Appl. No.: 12/662,503

(22) Filed: Apr. 20, 2010

(65) Prior Publication Data

US 2011/0194209 A1 Aug. 11, 2011

(30) Foreign Application Priority Data

Feb. 10, 2010 (CN) .......................... 2010 1 0118571

(51) Int. Cl.
*G11B 5/60* (2006.01)
(52) U.S. Cl. .................................................. 360/234.5
(58) Field of Classification Search ................ 360/234.5
See application file for complete search history.

(56) References Cited

U.S. PATENT DOCUMENTS

| | | | | |
|---|---|---|---|---|
| 5,376,584 A * | 12/1994 | Agarwala | | 438/614 |
| 6,111,321 A * | 8/2000 | Agarwala | | 257/772 |
| 6,409,073 B1 * | 6/2002 | Kaskoun et al. | | 228/180.22 |
| 6,429,046 B1 * | 8/2002 | Marlin | | 438/108 |
| 6,828,677 B2 * | 12/2004 | Yap et al. | | 257/737 |
| 7,101,781 B2 * | 9/2006 | Ho et al. | | 438/612 |
| 2011/0149423 A1 * | 6/2011 | Lasfargues et al. | | 359/883 |
| 2011/0193218 A1 * | 8/2011 | Arvin et al. | | 257/737 |

FOREIGN PATENT DOCUMENTS

| JP | 08055946 A | * | 2/1996 |
| JP | 10303245 A | * | 11/1998 |
| TW | 200816418 A | * | 4/2008 |

* cited by examiner

*Primary Examiner* — Will J Klimowicz
(74) *Attorney, Agent, or Firm* — Nixon & Vanderhye PC

(57) ABSTRACT

A magnetic recording head includes a trailing surface and a plurality of bonding pads arranged on the trailing surface and in a row adapted for both bonding and testing. Each of the bonding pads has at least one side portion being coated with electrically conductive solder nonwettable coat to prevent short circuit between the adjacent bonding pads. The invention also discloses a head gimbal assembly with the magnetic recording head and a disk drive unit having such head gimbal assembly.

16 Claims, 20 Drawing Sheets

US 8,320,081 B2

MAGNETIC RECORDING HEAD, HEAD GIMBAL ASSEMBLY, AND DISK DRIVE UNIT WITH THE SAME

This application claims priority to Chinese Application No. 201010118571.7 filed Feb. 10, 2010, the entire contents of which are hereby incorporated by reference.

FIELD OF THE INVENTION

The present invention relates to information recording disk drive devices, and more particularly to a magnetic recording head having additional bonding pads thereon. The present invention also relates to a head gimbal assembly, and a disk drive unit with the same.

BACKGROUND OF THE INVENTION

One known type of information storage device is a disk drive device that uses magnetic media to store data and a movable read/write head that is positioned over the magnetic media to selectively read from or write to the magnetic media.

FIG. 1a provides an illustration of a typical disk drive device. The disk drive device has a series of magnetic hard disks 101, a spindle motor 102 for spinning the disks 101, and a drive arm 104 with a head gimbal assembly (HGA) 100 mounted thereon. The HGA 100 includes a magnetic recording head 103 with a read/write head (not shown) embedded therein. A voice-coil motor (VCM, not labeled) is provided for controlling the motion of the drive arm 104 and, in turn, controlling the magnetic recording head 103 to move from track to track across the surface of the disks 101, thereby enabling the read/write head to read data from or write data to the disks 101. Moreover, the disk drive device also includes a load/unload device that commonly is a ramp 105 for loading/unloading the magnetic recording head 103. When the disk drive device operates, a lift force is generated by the aerodynamic interaction between the magnetic recording head 103 and the spinning magnetic disks 101. The lift force is opposed by equal and opposite spring force which is applied by the HGA 100 such that a predetermined flying height above the surface of the spinning disks 101 is maintained over a full radial stroke of the drive arm 104.

Now referring to FIGS. 1b-1c, a conventional HGA 100 comprises the magnetic recording head 103, a suspension 190 to load or suspend the magnetic recording head 103 thereon. As illustrated, the suspension 190 includes a load beam 206, a base plate 208, a hinge 207 and a flexure 205, all of which are assembled together.

The load beam 206 is connected to the base plate 208 by the hinge 207. A locating hole 212 is formed on the load beam 206 for aligning the load beam 206 with the flexure 205. As best shown in FIG. 1c, a dimple 211 is formed on the load beam 206 to transfer load forces generated by the load beam 206 to the flexure 205 at a position corresponding to a center of the magnetic recording head 103. By this engagement of the dimple 211 with the flexure 205, the load forces can be transferred to the magnetic recording head 103 uniformly, thus making the magnetic recording head 103 working more stably.

The base plate 208 is used to enhance structure stiffness of the whole HGA 100. A mounting hole 213 is formed on the end of the base plate 208 for mounting the whole HGA 100 to the drive arm 104 (refer to FIG. 1a). The hinge 207 has a mounting hole 210 formed on its one end corresponding to the mounting hole 213 of the base plate 208, and the hinge 207 is partially mounted to the base plate 208 with the mounting holes 210, 213 aligned with each other. The hinge 207 and the base plate 208 may be mounted together by laser welding at pinpoints 209 distributed on the hinge 207. Two hinge steps 215 are integrally formed at two sides of the hinge 207 at one end adjacent the mounting hole 210 for strengthening stiffness of the hinge 207. In addition, two hinge struts 214 are extended from the other end of the hinge 207 to partially mount the hinge 207 to the load beam 206.

The flexure 205 runs from the hinge 207 to the load beam 206. The flexure 205 has a proximal end 238 adjacent the hinge 207 and a distal end 216 adjacent the load beam 206. The flexure 205 of the suspension 190 also has a suspension tongue 236 with which almost an entire surface of one face of the magnetic recording head 103 comes in contact with and fixed. A locating hole 217 is formed on the distal end 216 of the flexure 205 and aligned with the locating hole 212 of the load beam 206, thus obtaining a high assembly precision.

FIG. 1d shows the tip part of the HGA 100 on which the magnetic recording head 103 is mounted. The suspension tongue 236 is also referred to as a gimbal whose one end is connected to the flexure 205, and the connection part exhibits a spring characteristic which functions to allow the loaded magnetic recording head 103 to keep a proper flying height with respect to the disks 101.

The suspension tongue 236 and the magnetic recording head 103 are securely fixed by an adhesive filled therebetween. Further, there are cases of using solder for fixing the magnetic recording head 103, whether or not the adhesive is used.

As illustrated in FIGS. 1d-1e, a plurality of electrical traces 304 is formed on the flexure 205 along length direction thereof. One end of the electrical traces 304 are electrically connected to six electrical pads 303 which are formed on the suspension tongue 236 and another end of the electrical traces 304 are electrically connected to a preamplifier (not shown). A trailing surface 305 of the magnetic recording head 103 has six bonding pads 301 corresponding to the six electrical pads 303. Concretely, the bonding pads 301 are electrically connected to the electrical pads 303 by solder joints 302, thus connecting to the electrical traces 304, thereby electrically connecting the magnetic recording head 103 to the electrical traces 304. When the magnetic recording head 103 is mounted on the suspension tongue 236 and electrically coupled with the electrical traces 304 by the bonding pads 301, the preamplifier controls the magnetic recording head 103, thus realizing data reading/writing operation with respect to the disks 101.

In the prior art, due to the size of the magnetic recording head 103, the number of the bonding pads 301 formed on the trailing surface 305 of the magnetic recording head 103 are normally six. Moreover, another two bonding pads 301 of the magnetic recording head 103 are disposed outside the magnetic recording head 103. During the process of producing the magnetic recording head 103, all the bonding pads 301 are adapted for both bonding the magnetic recording head 103 to the suspension 190 of the HGA 100 and testing the performance of the magnetic recording head 103. Concretely, among the bonding pads 301 formed on the magnetic recording head 103, a pair of the bonding pads 301 is electrically connected to a reading element (not shown) for reading data from the disks 101, a pair of the bonding pads 301 is electrically connected to a writing element (not shown) for writing data to the disks 101, and a pair of the bonding pads 301 are electrically connected to a thermal resistance (not shown) for heating a pole tip formed on an air bearing surface of the magnetic recording head 103 which facing to the surface of the disks 101. Further, the pair of the bonding pads 301 disposed outside of the magnetic recording head 103 is electrically connected to a sensor (not shown) for inducting the affection between magnetic recording head 103 and the disks 101 and then adjusting the flying height of the magnetic recording head 103.

However, firstly, because the pair of the bonding pads 301 electrically connected to the sensor is placed outside the magnetic recording head 103, the flying height of the magnetic recording head 103 can not be adjusted immediately when the sensor is inducting the affection between the magnetic recording head 103 and the disks 101 and, in turn, affecting the reading/writing performance of the magnetic recording head 103. Secondly, in order to meet the request of the testing, the size of the bonding pads 301 is as big as the size of a probe of the testing device. And due to the small room and the size of the magnetic recording head 103, it is difficult to place other bonding pads with additional functions on the trailing surface of the magnetic recording head 103 and, in turn, the function or performance of the magnetic recording head 103 is limited. Thirdly, due to the small space between a bonding pad and the adjacent bonding pad, it is easy to create a short circuit therebetween, thus damaging the magnetic recording head 103.

Hence, there is a need for an improved magnetic recording head, head gimbal assembly and disk drive unit that do not suffer from the above-mentioned drawbacks.

SUMMARY OF THE INVENTION

Accordingly, one objective of the present invention is to provide a magnetic recording head having more bonding pads formed thereon to connect to more components with special function formed therein, thus supporting more functions to the magnetic recording head, in turn, improving the reading and writing performance of the magnetic recording head.

Another objective of the present invention is to provide a magnetic recording head preventing short circuit between the bonding pads.

Still another objective of the present invention is to provide a HGA with a magnetic recording head having more bonding pads formed thereon to connect to more components with special function, thus supporting more functions to the HGA, thus achieving stable reading and writing of the data.

Yet another objective of the present invention is to provide a disk drive unit with a HGA which is capable of improving the read/writing performance of the disk drive unit.

To achieve the above-mentioned objective, a magnetic recording head comprises a trailing surface and a plurality of bonding pads arranged on the trailing surface and in a row adapted for both bonding and testing. Each of the bonding pads has an electrically conductive solder nonwettable coat coating on one side portion thereof to prevent short circuit between the adjacent bonding pads.

As an embodiment of the magnetic recording head according to the present invention, at least eight bonding pads are formed on the trailing surface of the magnetic recording head.

As another embodiment of the magnetic recording head according to the present invention, the electrically conductive solder nonwettable coat is made of nickel alloy, titanium alloy, tantalum alloy, aluminum alloy or diamond like carbon.

As still another embodiment of the magnetic recording head according to the present invention, the bonding pad has a convex portion for forming a step, the electrically conductive solder nonwettable coat is formed on the step of the bonding pad.

As yet another embodiment of the magnetic recording head according to the present invention, the electrically conductive solder nonwettable coat is formed on the surface of one side portion of the bonding pad.

As still another embodiment of the magnetic recording head according to the present invention, the bonding pad has a convex portion for forming two steps, two electrically conductive solder nonwettable coats are formed on the two steps of the bonding pad respectively.

As yet another embodiment of the magnetic recording head according to the present invention, two electrically conductive solder nonwettable coats are formed on the surface of two side portions of the bonding pad.

A HGA of the present invention comprises a magnetic recording head and a suspension having a suspension tongue with electrical pads adapted for mounting the magnetic recording head thereon. The magnetic recording head comprises a trailing surface and a plurality of bonding pads arranged on the trailing surface and in a row for both bonding and testing. Each of the bonding pads has an electrically conductive solder nonwettable coat coating on at least one side portion thereof to prevent short circuit between the adjacent bonding pads. And the bonding pads are electrically connected to the electrical pads formed on the suspension.

A disk drive unit of the present invention comprises a HGA, a drive arm connected to the HGA, a disk, and a spindle motor operable to spin the disk. The HGA includes a magnetic recording head and a suspension having a suspension tongue with electrical pads for mounting the magnetic recording head thereon. The magnetic recording head comprises a trailing surface and a plurality of bonding pads arranged on the trailing surface and in a row adapted for both bonding and testing. Each of the bonding pads has an electrically conductive solder nonwettable coat coating on at least one side portion thereof to prevent short circuit between the adjacent bonding pads. And the bonding pads are electrically connected to electrical pads formed on the suspension.

Since each of the bonding pads has an electrically conductive solder nonwettable coat coating on at least one side portion thereof, the electrically conductive solder nonwettable coat prevents the solder joints from spreading to the adjacent bonding pad when bonding the bonding pads to the electrical pads by solder joints, in turn, preventing short circuit between the adjacent bonding pads, thereby disposing more additional bonding pads on the trailing surface of the magnetic recording head, thus improving flying stability of the magnetic recording head, and finally improving reading/writing characteristics of the magnetic recording head and performance of the entire disk drive device.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 2b is a partial perspective view of the HGA shown in FIG. 2a;

FIG. 3b is a cross-sectional side view of the magnetic recording head shown in FIG. 3a taken along the line B-B of FIG. 3a;

FIG. 4b is a plan view of the magnetic recording head of FIG. 4a;

FIG. 5b is a partial perspective view of the HGA shown in FIG. 5a;

FIG. 6b is a cross-sectional side view of the magnetic recording head shown in FIG. 6a taken along the line E-E of FIG. 6a;

FIG. 7b is a plan view of the magnetic recording head of FIG. 7a;

DETAILED DESCRIPTION OF ILLUSTRATED EMBODIMENTS

Figure 1A:
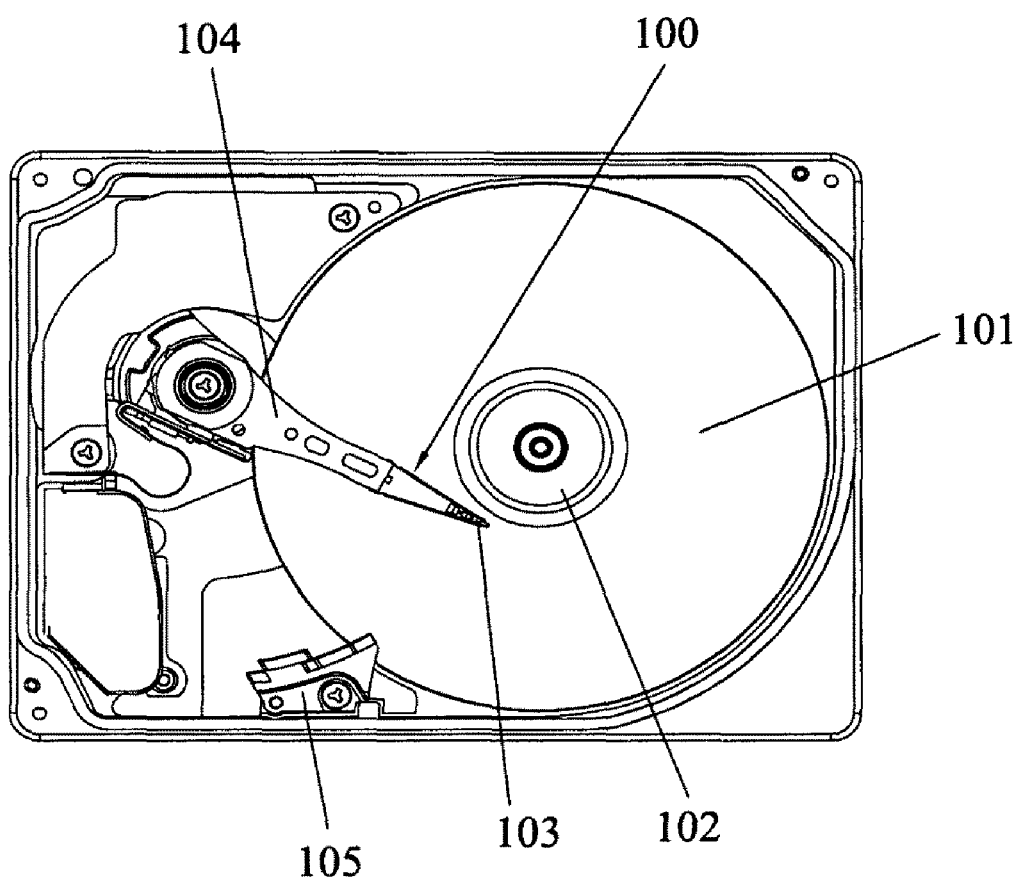
FIG. 1a is a top plan view of a conventional disk drive unit.
Figure 1B:
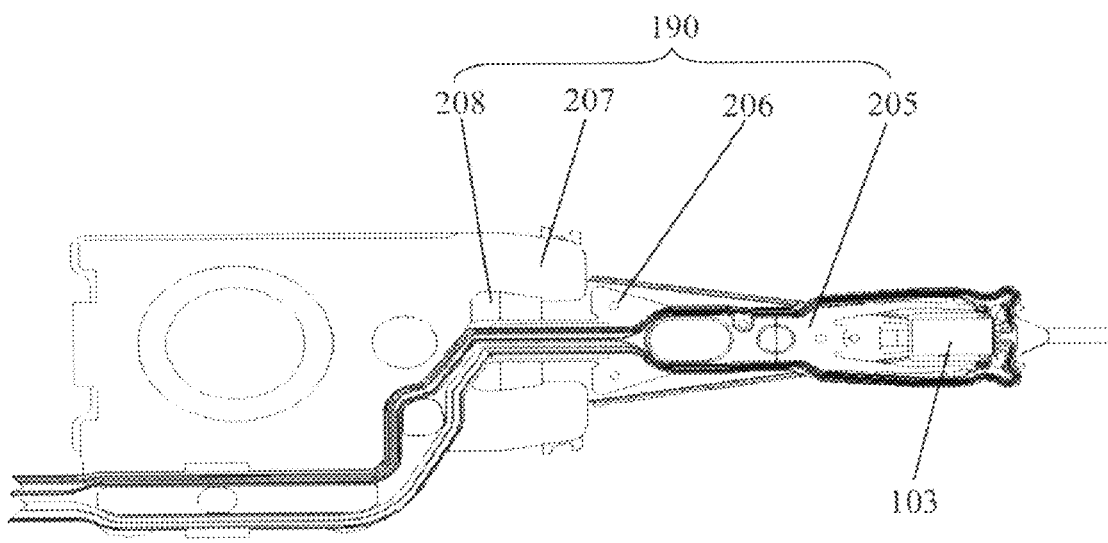
FIG. 1b is a top plan view of a conventional HGA.
Figure 1C:
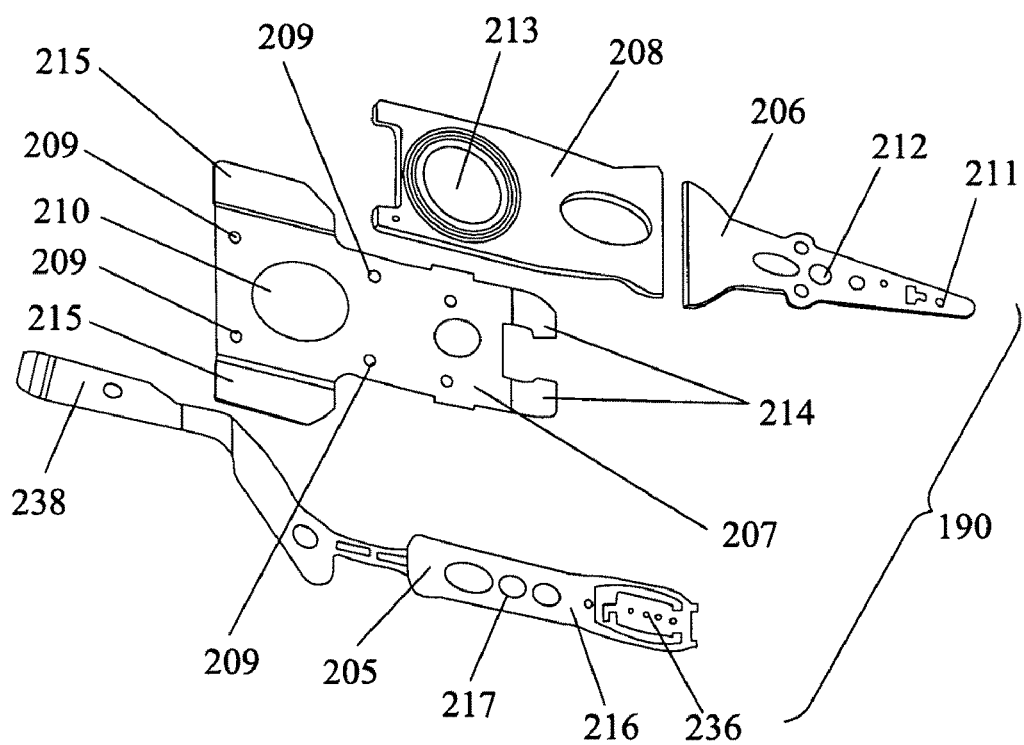
FIG. 1c is an exploded perspective view of the HGA shown in FIG. 1b.
Figure 1D:
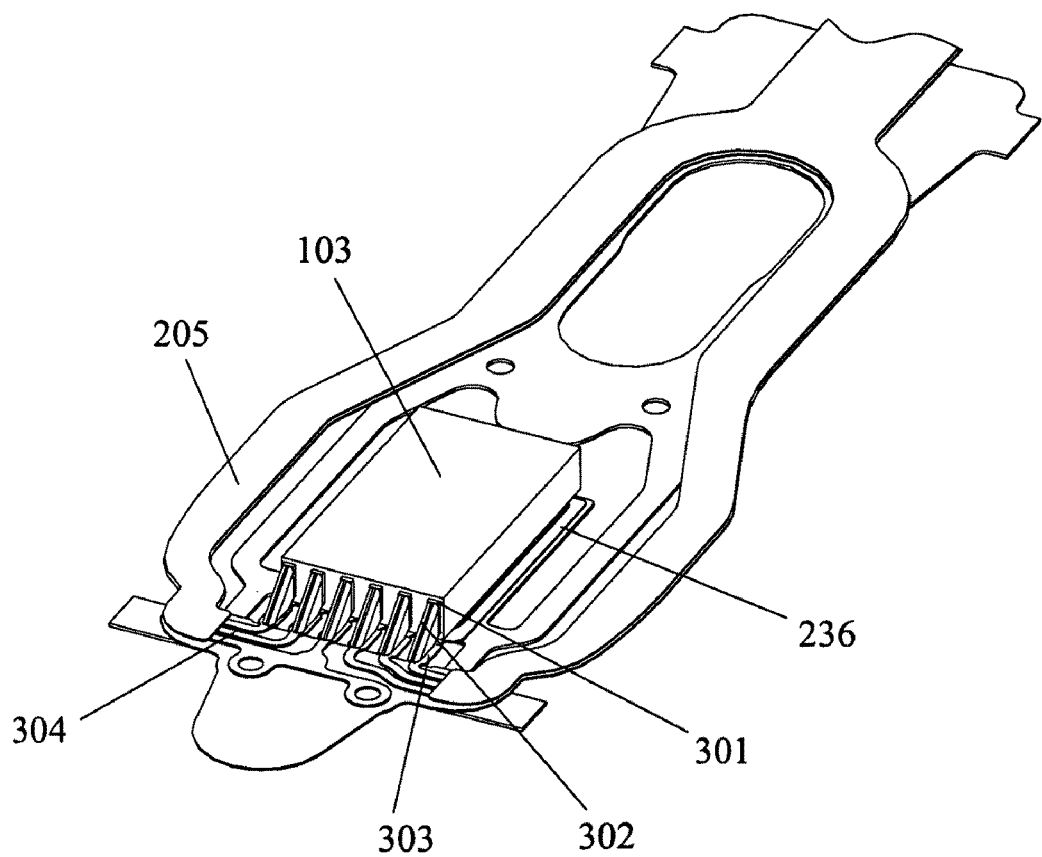
FIG. 1d is a partial perspective view of the HGA shown in FIG. 1b.
Figure 1E:
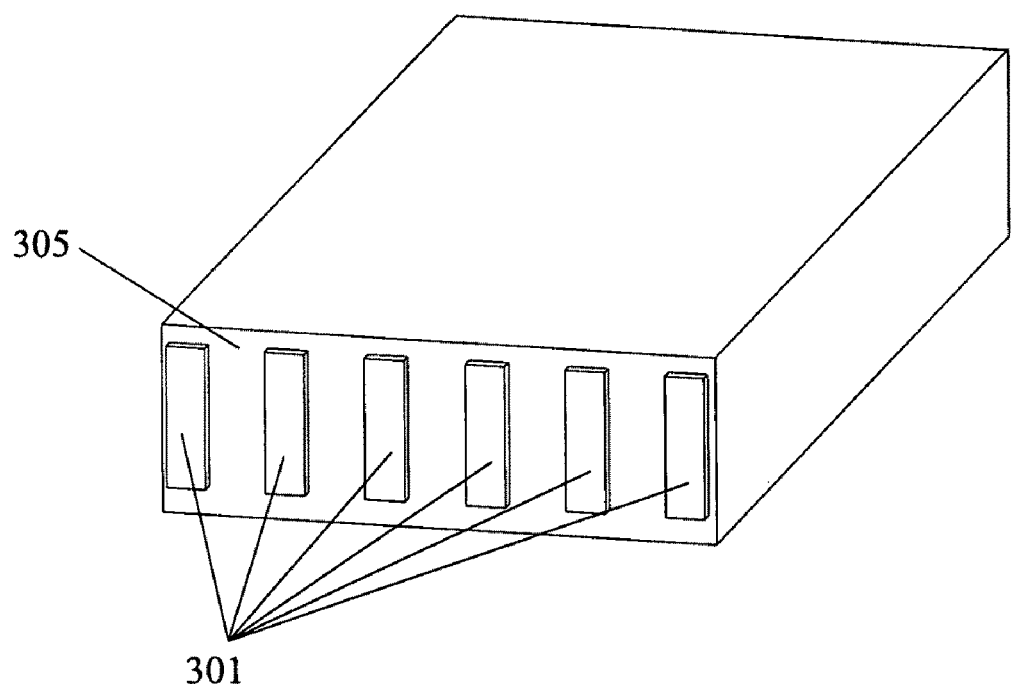
FIG. 1e is the perspective view of the magnetic recording head shown in FIG. 1d.

Various preferred embodiments of the invention will now be described with reference to the figures, wherein like reference numerals designate similar parts throughout the various views. As indicated above, the invention is directed to a magnetic recording head having more bonding pads formed thereon to connect to more components with special function formed therein, thus supporting more functions to the magnetic recording head, in turn, improving the reading and writing performance of the magnetic recording head.

Figure 2A:
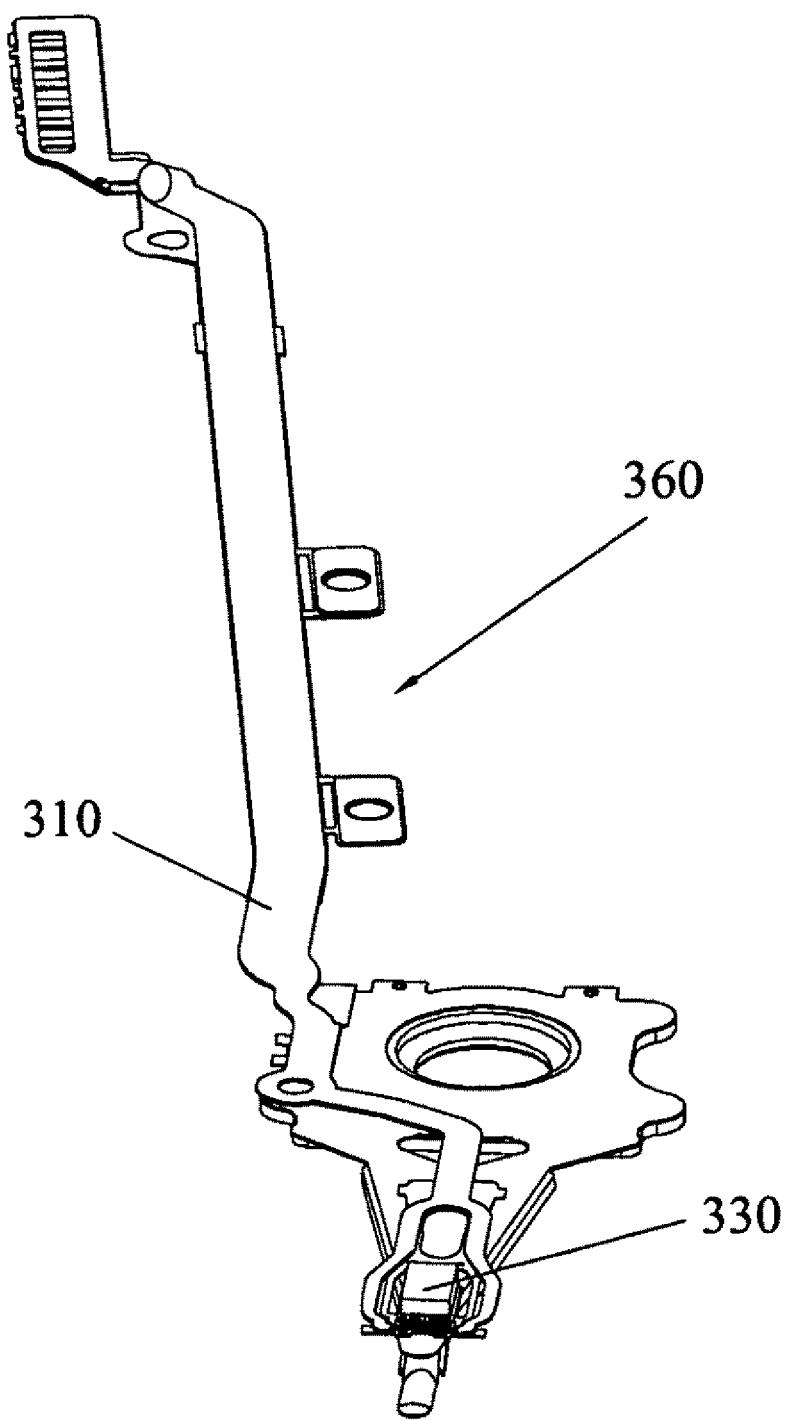
FIG. 2a is a perspective view of the HGA with ten bonding pads according to a first embodiment of the present invention.
Figure 2B:
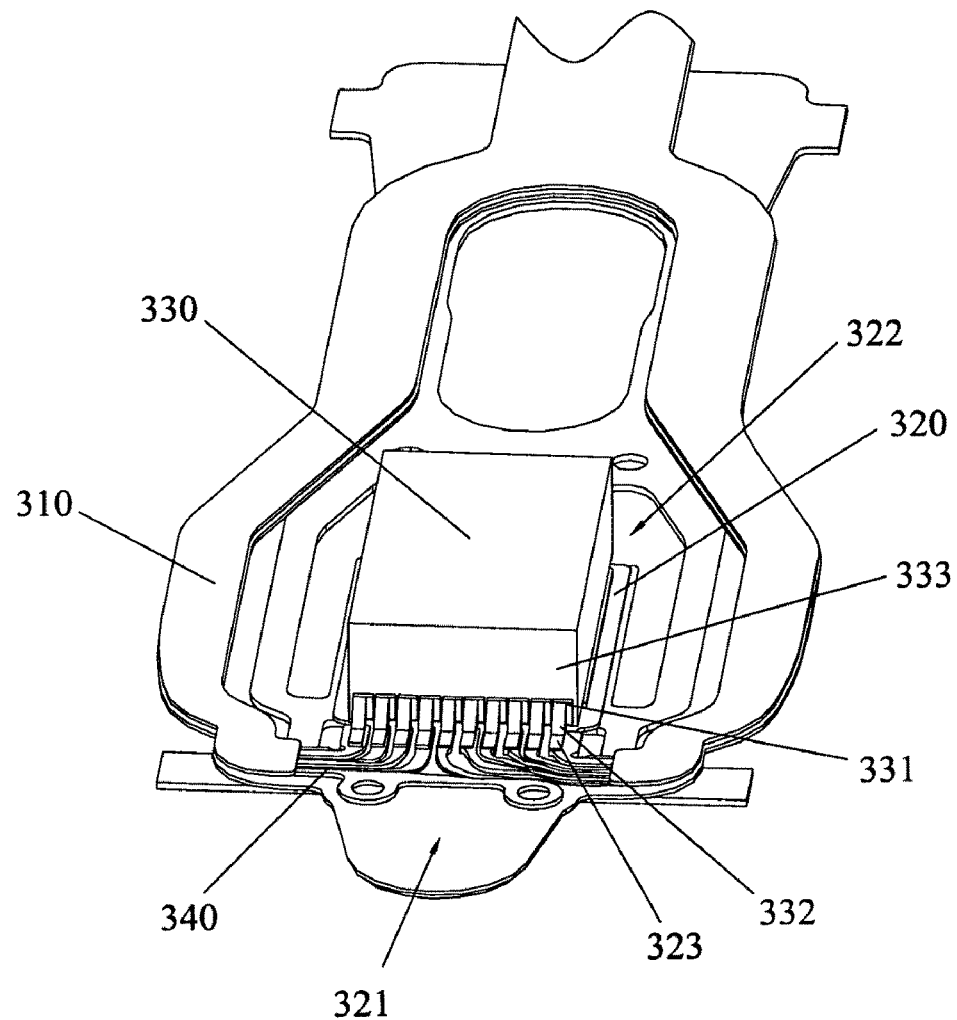

FIG. 2a shows a HGA 300 of a first embodiment according to the present invention. FIG. 2b shows a tip portion of the HGA 300 shown in FIG. 2a. Referring to FIGS. 2a-2b, the HGA 300 includes a magnetic recording head 330 and a suspension 360 having a flexure 310 for loading the magnetic recording head 330 thereon. The flexure 310 has a suspension tongue 320 at a tip portion thereof. The suspension tongue 320 has a trailing portion 321 adapted to be bonded to a trailing surface 333 of the magnetic recording head 330 and a leading portion 322 adapted to be bonded to a leading surface of the magnetic recording head 330. Concretely, in this embodiment, a plurality of electrical pads 323, such as ten, are disposed on the suspension tongue 320 for electrically connecting the magnetic recording head 330. And the electrical pads 323 are electrically connected to a plurality of electrical traces 340. A plurality of bonding pads 331, such as ten, are disposed on the trailing surface 333 of the magnetic recording head 330 and connected to the ten electrical pads 323 by ten solder joints 332, thus electrically connecting the magnetic recording head 330 to the electrical traces 340, thereby electrically connecting the magnetic recording head 330 to the control servo (not shown). It should be noted that the number of the bonding pads 331 and the electrical pads 323 can be varied depending on the actual requirement.

Figure 2C:
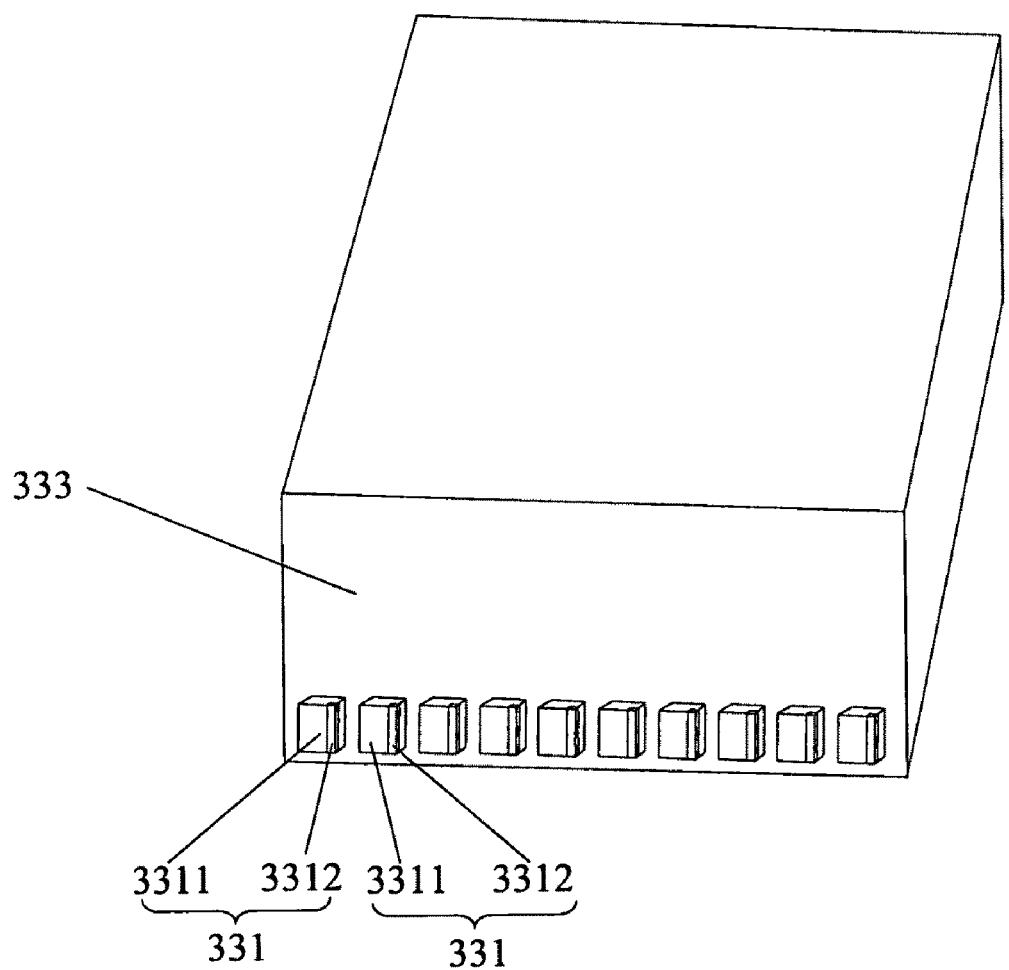
FIG. 2c is a perspective view of the magnetic recording head with ten bonding pads shown in FIG. 2b.
Figure 2D:
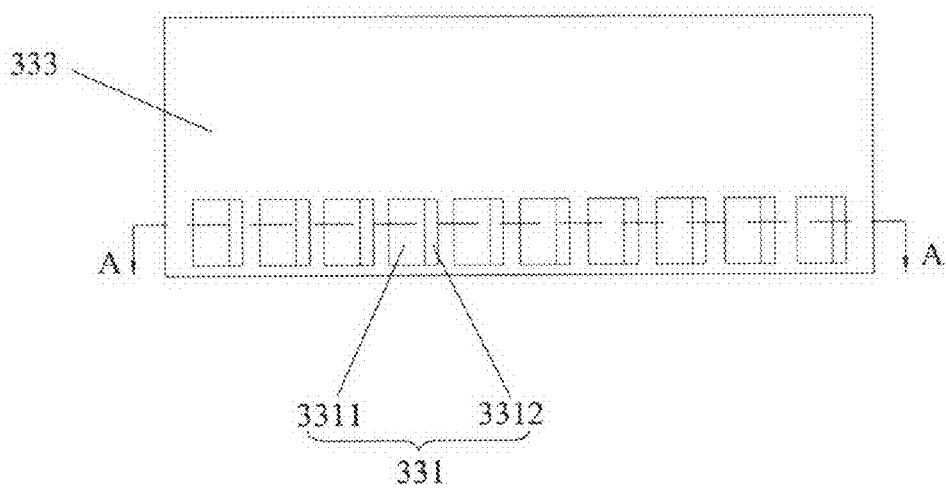
FIG. 2d is a plan view of the magnetic recording head of FIG. 2c.
Figure 2E:
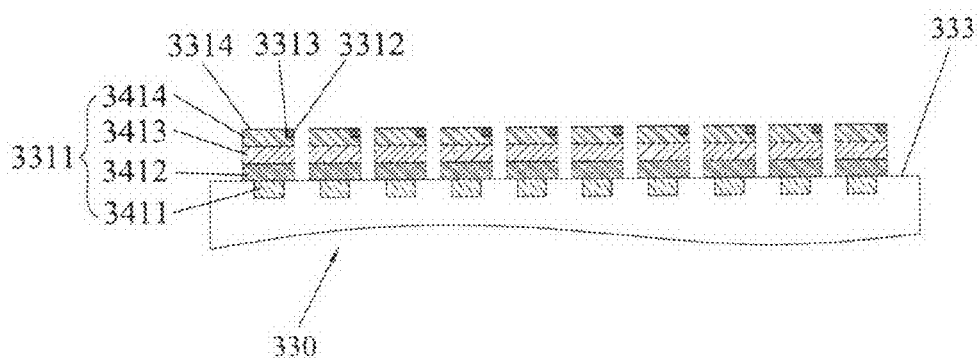
FIG. 2e is a cross-sectional side view of the magnetic recording head shown in FIG. 2d taken along the line A-A of FIG. 2d.

FIGS. 2c-2e illustrate the detailed structure of the magnetic recording head 330. Referring to FIGS. 2c-2e, each of the bonding pads 331 includes a bonding portion 3311 and an electrically conductive solder nonwettable coat 3312. The bonding portion 3311 further comprises a copper layer 3411 embedded in the magnetic recording head 330, a titanium layer or a tantalum layer 3412 formed on the trailing surface 333 of the magnetic recording head 330 and connected to the copper layer 3411, a nickel-iron alloy layer 3413 formed on the titanium layer or the tantalum layer 3412, and a gold layer 3414 formed on the nickel-iron alloy layer 3413. Concretely, the gold layer 3414 has a convex portion 3314 for forming a step 3313 and the electrically conductive solder nonwettable coat 3312 is formed on the step 3313. As illustrated in FIG. 2c, the bonding portion 3311 is spaced out the adjacent bonding portion 3311 thereto by the electrically conductive solder nonwettable coat 3312. The electrically conductive solder nonwettable coat 3312 is made of an electrically conductive solder nonwettable material, such as nickel alloy, titanium alloy, tantalum alloy, aluminum alloy or diamond like carbon. In this embodiment, the electrically conductive solder nonwettable coat 3312 is made of nickel-iron alloy and the solder joint 332 is made of a lead free solder. Due to the materials of the electrically conductive solder nonwettable coat 3312 and the solder joint 332, the electrically conductive solder nonwettable coat 3312 prevents the solder joint 332 from spreading from the bonding portion 3311 to the adjacent bonding portion 3311, thus spacing out the solder joint 332 and the adjacent solder joint 332. In the process of mounting the magnetic recording head 330 to the suspension 360, the bonding portions 3311 are used to bond the bonding pads 331 to the electrical pads 323 by the solder joints 332. The electrically conductive solder nonwettable coat 3312 together with the bonding portions 3311 are used to test the performance of the magnetic recording head 330 by a pair of probes. Because the forming method of an electrically conductive solder nonwettable coat 3312 on the bonding pads 331 is well known to persons ordinarily skilled in the art, a detailed description of such forming method is omitted herefrom.

Figure 3A:
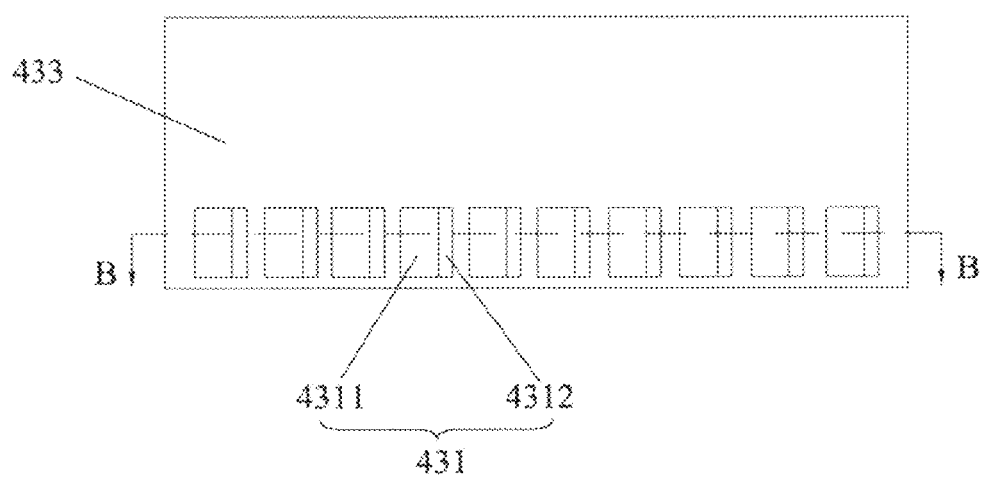
FIG. 3a is a plan view showing the magnetic recording head according to a second embodiment of the present invention.
Figure 3B:
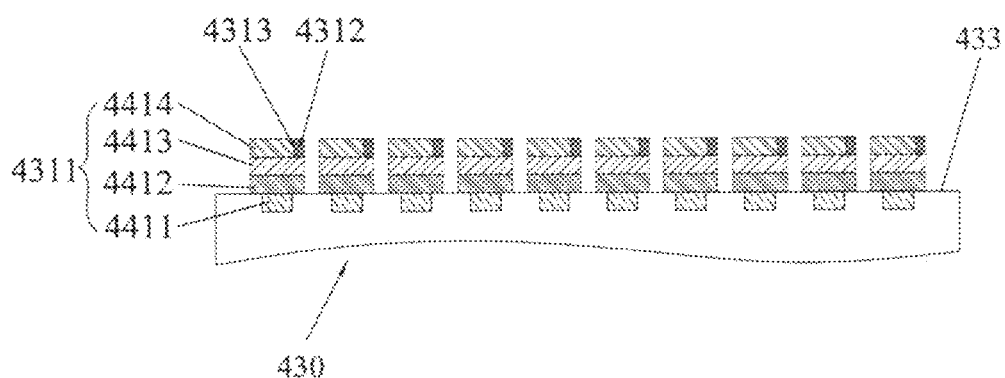

FIGS. 3a-3b illustrate the detailed structure of the magnetic recording head 430 according to a second embodiment of the present invention. The structure of the magnetic recording head 430 of the second embodiment is similar to that of the magnetic recording head 330 shown in FIG. 2c associated with the first embodiment, except the forming position of the electrically conductive solder nonwettable coat 4312. Referring to FIG. 3b, in this embodiment, the bonding portion 4311 further comprises a copper layer 4411 embedded in the magnetic recording head 430, a titanium layer or a tantalum layer 4412 formed on the trailing surface 433 of the magnetic recording head 430 and connected to the copper layer 4411, a nickel-iron alloy layer 4413 formed on the titanium layer or the tantalum layer 4412, and a gold layer 4414 formed on the nickel-iron alloy layer 4413. Concretely, the electrically conductive solder nonwettable coat 4312 is formed on the surface of the nickel-iron alloy layer 4413 and connected to one side edge 4313 of the gold layer 4414.

Figure 4A:
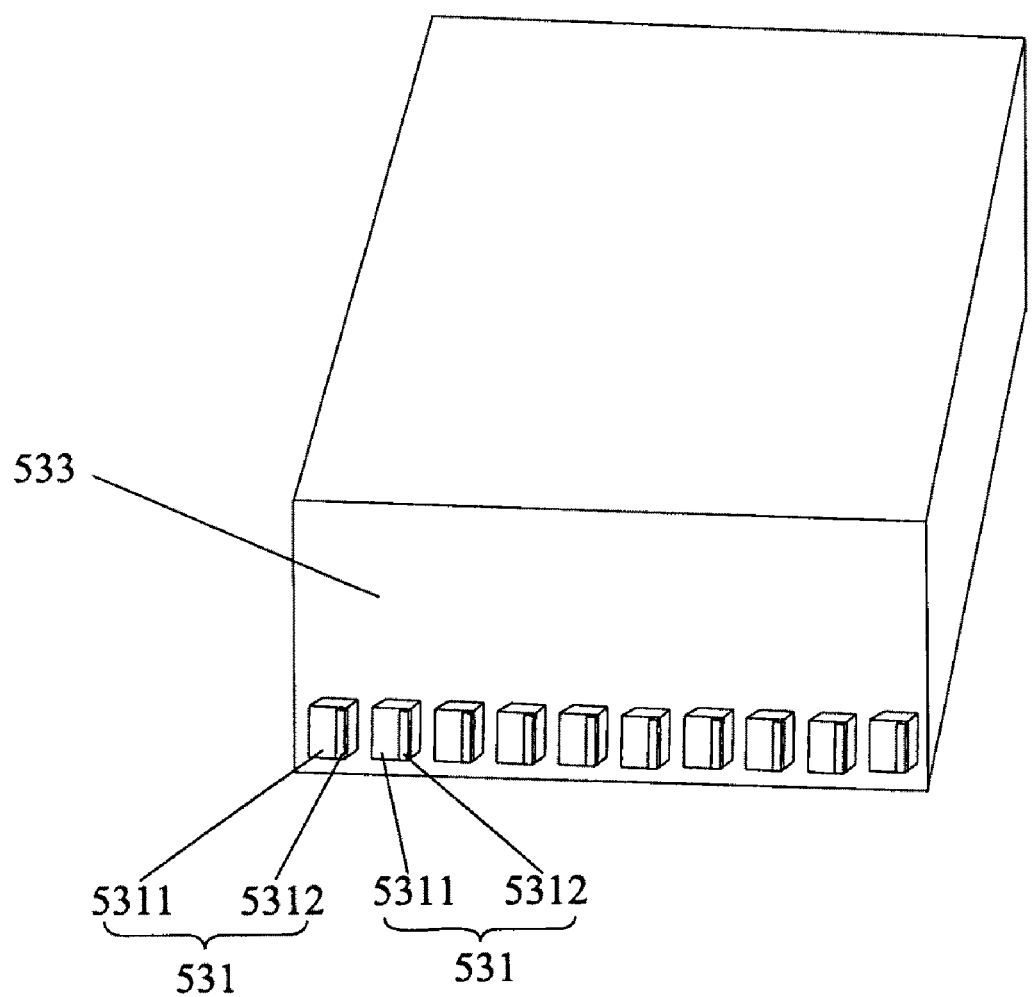
FIG. 4a is a perspective view of the magnetic recording head with ten bonding pads according to a third embodiment of the present invention.
Figure 4B:
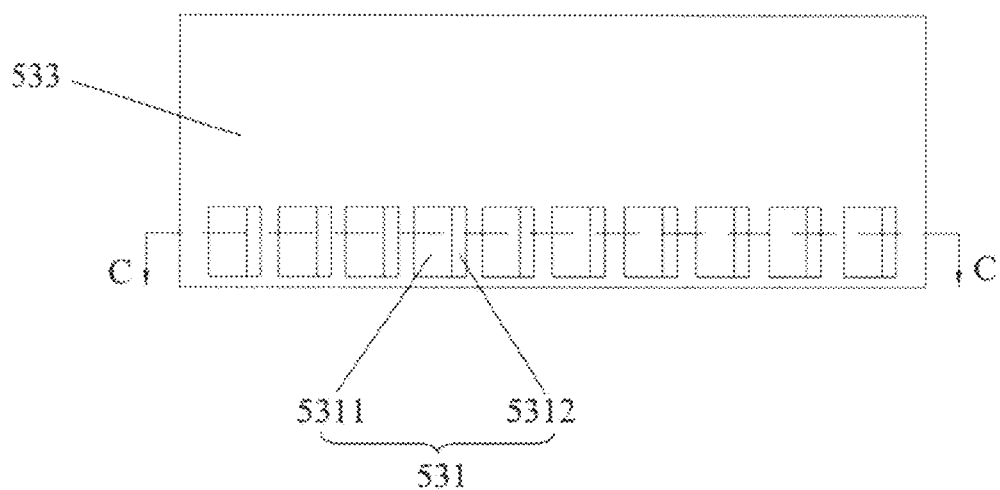
Figure 4C:
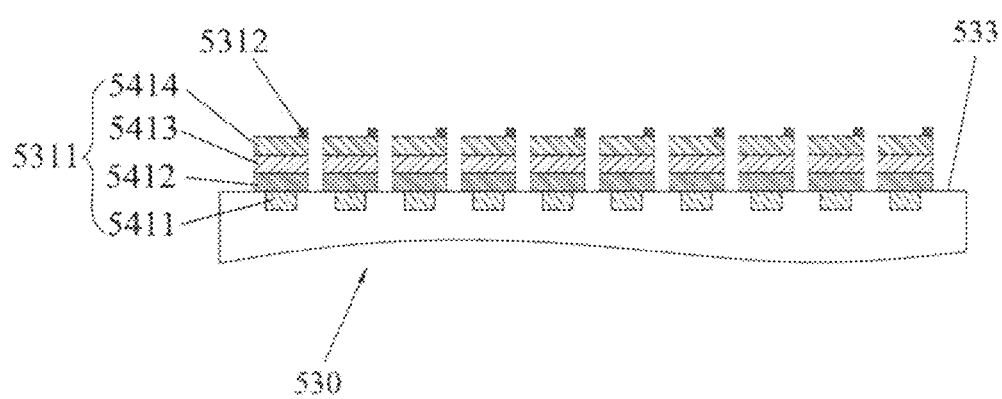
FIG. 4c is a cross-sectional side view of the magnetic recording head shown in FIG. 4b taken along the line C-C of FIG. 4b.

FIGS. 4a-4c illustrate the detailed structure of the magnetic recording head 530 according to a third embodiment of the present invention. The structure of the magnetic recording head 530 of the third embodiment is similar to that of the magnetic recording head 330 shown in FIG. 2c associated with the first embodiment, except the forming position of the electrically conductive solder nonwettable coat 5312. Referring to FIG. 4c, in this embodiment, the bonding portion 5311 further comprises a copper layer 5411 embedded in the magnetic recording head 530, a titanium layer or a tantalum layer 5412 formed on the trailing surface 533 of the magnetic recording head 530 and connected to the copper layer 5411, a nickel-iron alloy layer 5413 formed on the titanium layer or the tantalum layer 5412, and a gold layer 5414 formed on the nickel-iron alloy layer 5413. Concretely, the electrically conductive solder nonwettable coat 5312 is formed on the surface of one side portion of the gold layer 5414.

In some case, an element (not shown) with special function which is formed on or outside the magnetic recording head can be embedded into the magnetic recording head. At the same time, a pair of additional bonding pads are disposed on the trailing surface of the magnetic recording head and connected to the element with special function by electrical traces. Thereby, the magnetic recording head has an additional function, thus improving the reading/writing performance of the magnetic recording head.

Figure 5A:
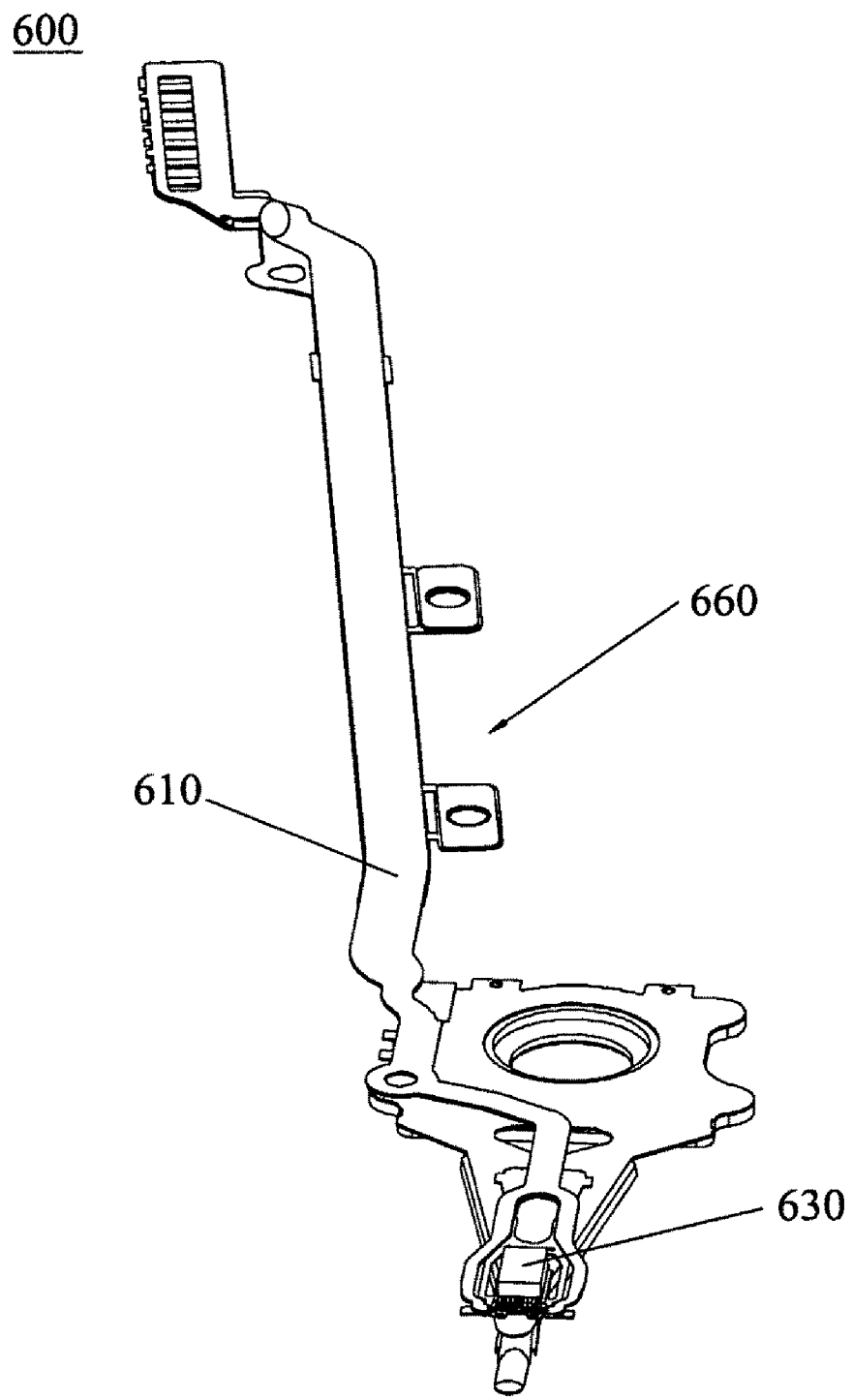
FIG. 5a is a perspective view of the HGA with ten bonding pads according to a fourth embodiment of the present invention.
Figure 5B:
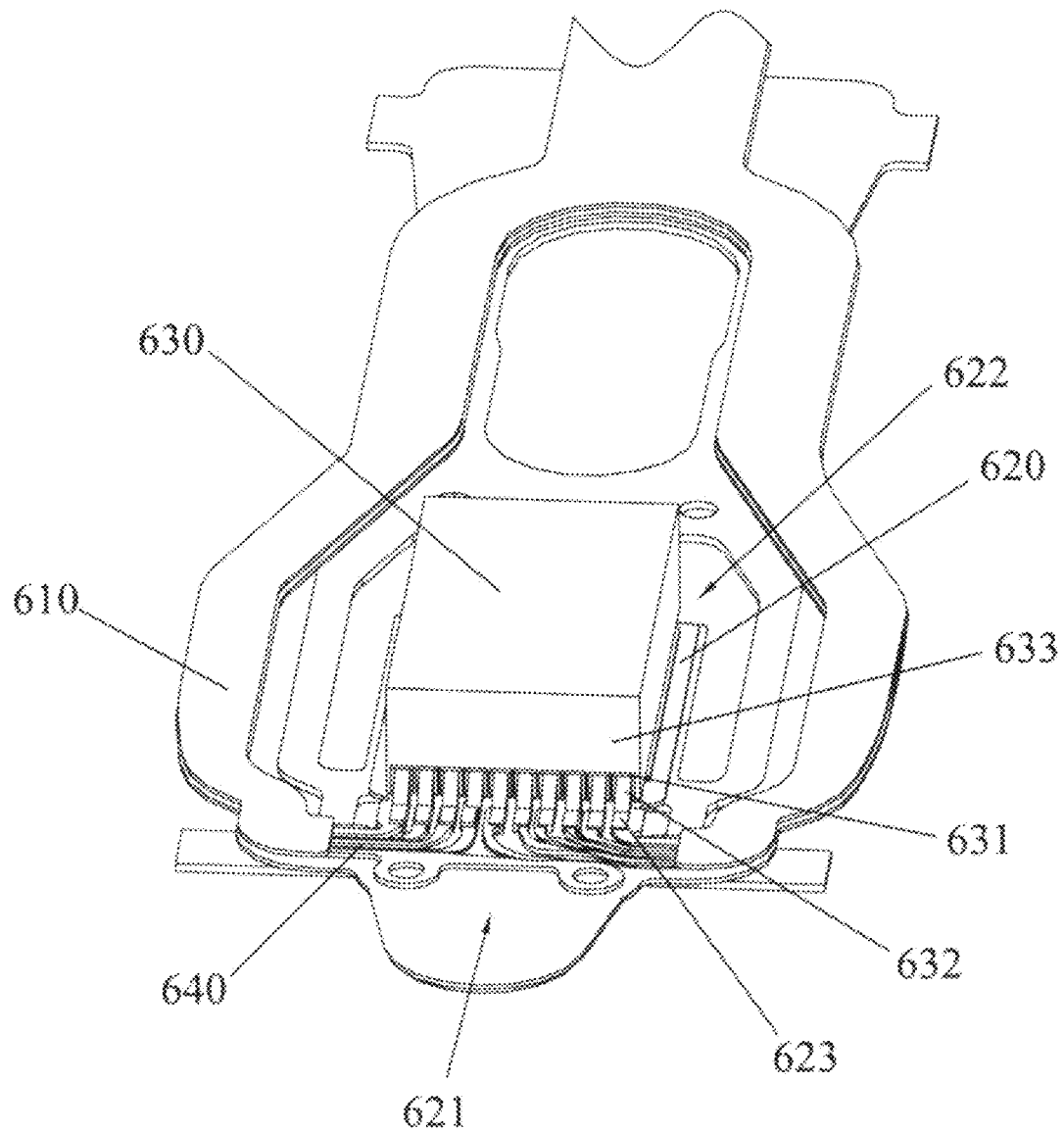

FIGS. 5a-5e illustrate a HGA 600 of a fourth embodiment according to the present invention. FIG. 5b shows a tip portion of the HGA 600 shown in FIG. 5a. Same with the first embodiment, the HGA 600 includes a magnetic recording head 630 and a suspension 660 having a flexure 610 for loading the magnetic recording head 630 thereon. The flexure 610 has a suspension tongue 620 with a trailing portion 621 adapted to be bonded to a trailing surface 333 of the magnetic recording head 630 and a leading portion 622 adapted to be bonded to a leading surface of the magnetic recording head 630. The connection between the magnetic recording head 630 and the suspension tongue 620 is similar to that of the first embodiment.

Figure 5C:
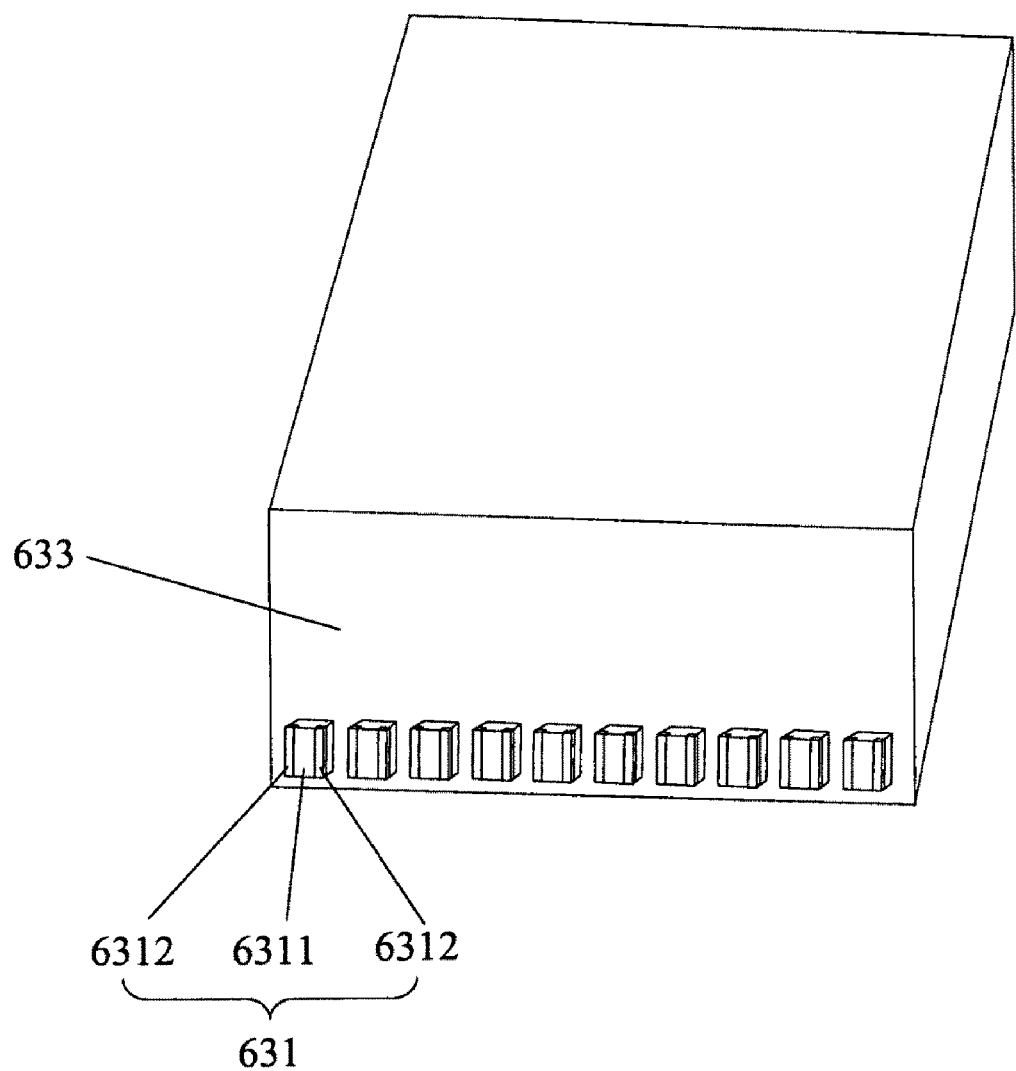
FIG. 5c is a perspective view of the magnetic recording head with ten bonding pads shown in FIG. 5b.
Figure 5D:
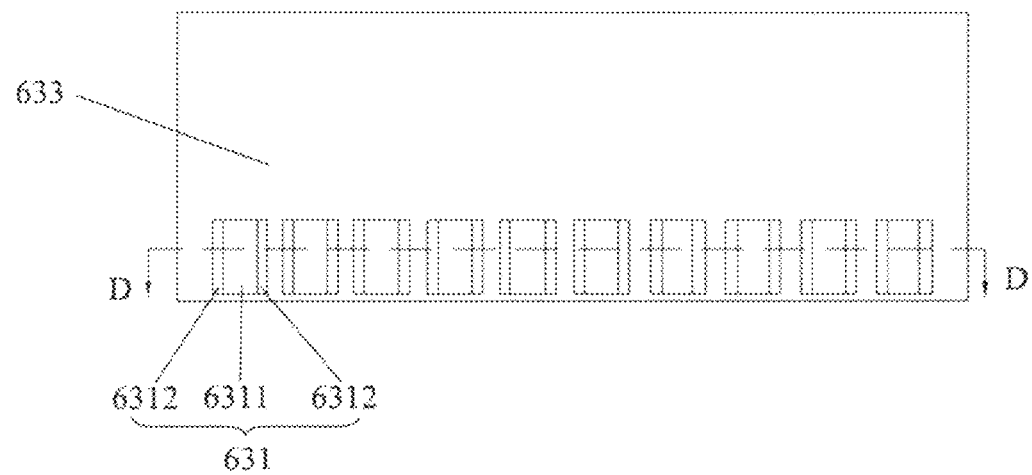
FIG. 5d is a plan view of the magnetic recording head of FIG. 5c.
Figure 5E:
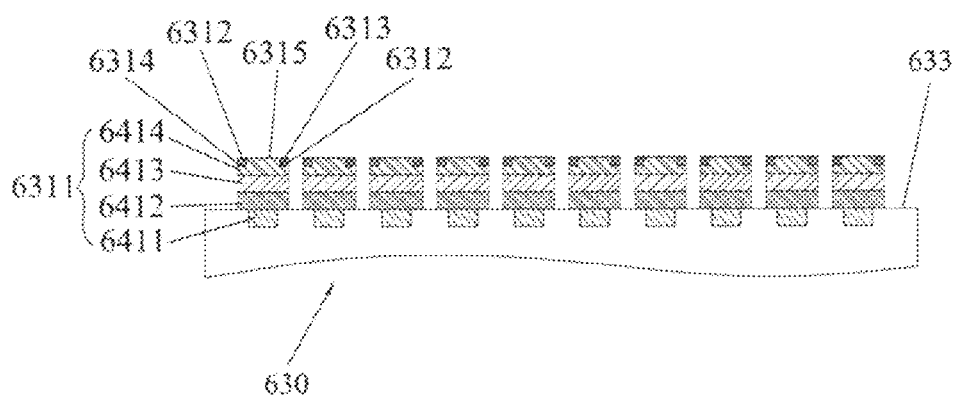
FIG. 5e is a cross-sectional side view of the magnetic recording head shown in FIG. 5d taken along the line D-D of FIG. 5d.

FIGS. 5c-5e illustrate the detailed structure of the magnetic recording head 630. The main distinction between the fourth embodiment and the first embodiment is that the structure of the bonding pads. Referring to FIGS. 5c-5e, each of the bonding pads 631 includes a bonding portion 6311 and two electrically conductive solder nonwettable coats 6312. The bonding portion 6311 further comprises a copper layer 6411 embedded in the magnetic recording head 630, a titanium layer or a tantalum layer 6412 formed on the copper layer 6411 and the trailing surface 633 of the magnetic recording head 630, a nickel-iron alloy layer 6413 formed on the titanium layer or the tantalum layer 6412, and a gold layer 6414 formed on the nickel-iron alloy layer 6413. The gold layer 6414 has a convex portion 6315 for forming two steps 6313, 6314 and the two electrically conductive solder nonwettable coats 6312 are formed on the two steps 6313 and 6314 respectively. As illustrated in FIG. 5c, the bonding portion 6311 are disposed between two electrically conductive solder nonwettable coats 6312 and spaced out the adjacent bonding portion 6311 by the two electrically conductive solder nonwettable coats 6312. And the two electrically conductive solder nonwettable coats 6312 are made of an electrically conductive solder nonwettable material, such as nickel alloy, titanium alloy, tantalum alloy, aluminum alloy or diamond like carbon. More concretely, in this embodiment, the two electrically conductive solder nonwettable coats 6312 are made of nickel-iron alloy and the solder joint 632 is made of a lead free solder. Due to the materials of the electrically conductive solder nonwettable coats 6312 and the solder joints 632, the two electrically conductive solder nonwettable coats 6312 prevents the solder joint 632 from spreading from the bonding portion 6311 to the adjacent bonding portion 6311, thus spacing out the solder joint 632 and the adjacent solder joint 632. In the process of mounting the magnetic recording head 630 to the suspension 660, the bonding portions 6311 are used to bond the bonding pads 631 to the electrical pads 623 by the solder joints 632. Two electrically conductive solder nonwettable coats 6312 together with the bonding portions 6311 are used to test the performance of the magnetic recording head 630 by a pair of probes.

Figure 6A:
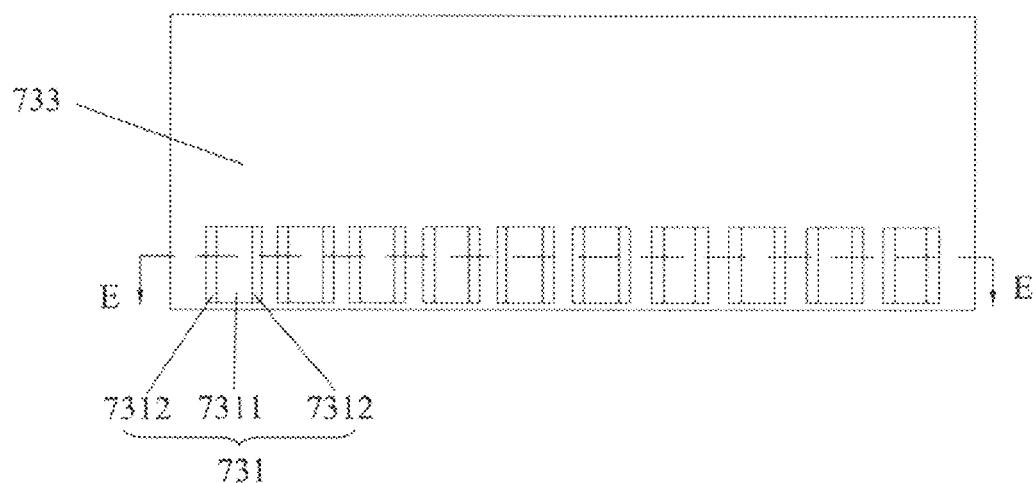
FIG. 6a is a plan view of the magnetic recording head according to a fifth embodiment of the present invention.
Figure 6B:
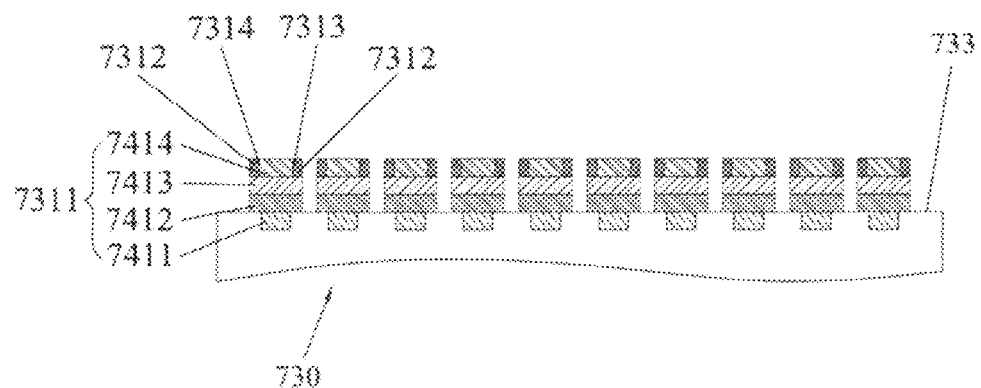

FIGS. 6a-6b illustrate the detailed structure of the magnetic recording head 730 according to a fifth embodiment of the present invention. The structure of the magnetic recording head 730 of the fifth embodiment is similar to that of the magnetic recording head 630 shown in FIG. 5c associated with the fourth embodiment, except the forming position of two electrically conductive solder nonwettable coats 7312. Referring to FIG. 6b, in this embodiment, the bonding portion 7311 further comprises a copper layer 7411 embedded in the magnetic recording head 730, a titanium layer or a tantalum layer 7412 formed on the trailing surface 733 of the magnetic recording head 730 and connected to the copper layer 7411, a nickel-iron alloy layer 7413 formed on the titanium layer or the tantalum layer 7412, and a gold layer 7414 formed on the nickel-iron alloy layer 7413. Concretely, two electrically conductive solder nonwettable coats 7312 are formed on the surface of the nickel-iron alloy layer 7413 and connected to two opposite side edges 7313, 7314 of the gold layer 7414 respectively.

Figure 7A:
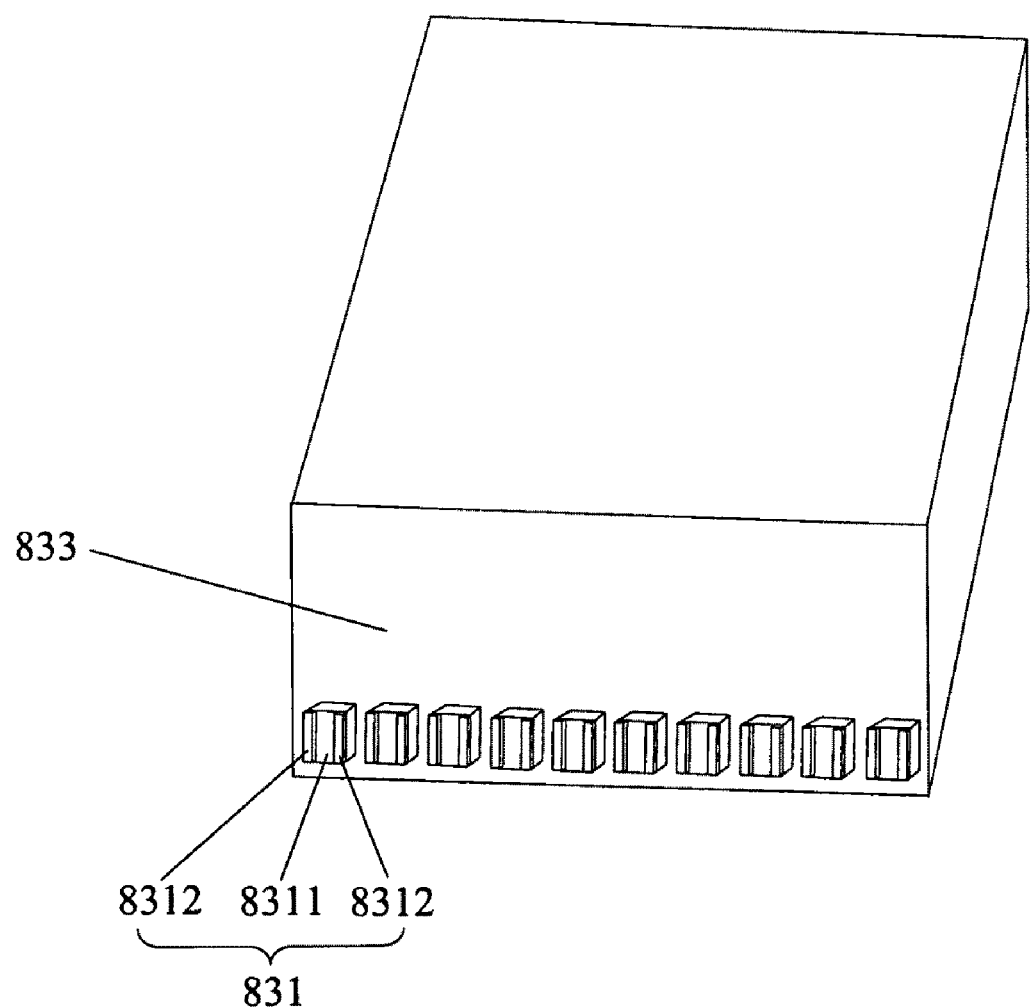
FIG. 7a is a perspective view of the magnetic recording head with ten bonding pads according to a sixth embodiment of the present invention.
Figure 7B:
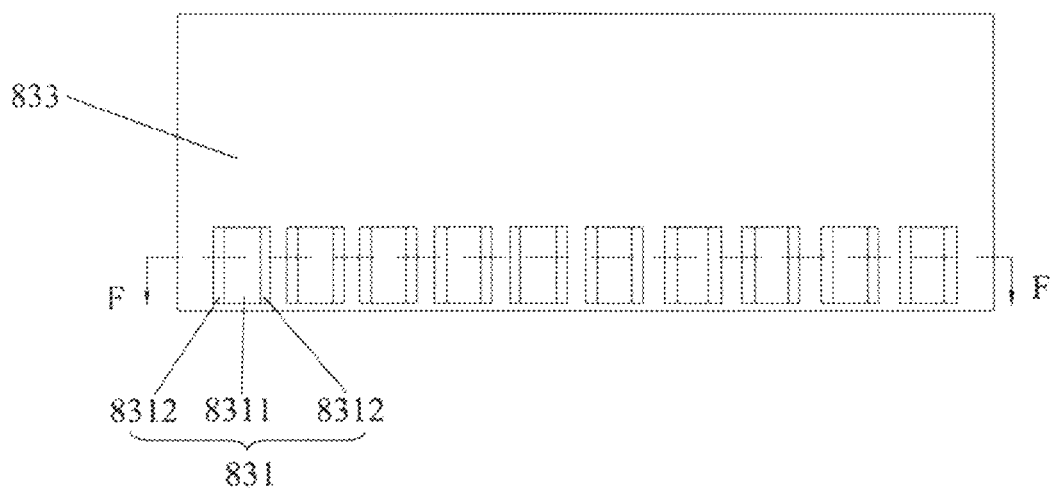
Figure 7C:
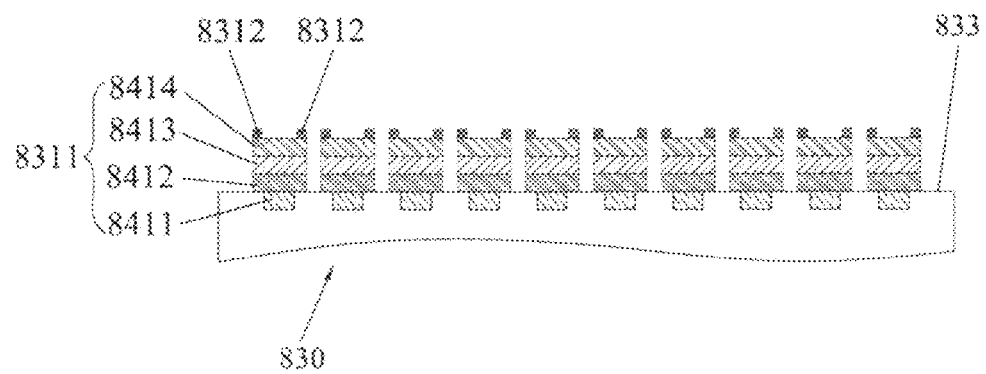
FIG. 7c is a cross-sectional side view of the magnetic recording head shown in FIG. 7b taken along the line F-F of FIG. 7b.

FIGS. 7a-7c illustrate the detailed structure of the bonding pads 831 of the magnetic recording head 830 according to a sixth embodiment of the present invention. The structure of the magnetic recording head 830 of the sixth embodiment is similar to that of the magnetic recording head 630 shown in FIG. 5c associated with the fourth embodiment, except the forming position of two electrically conductive solder nonwettable coats 8312. Referring to FIG. 7c, in this embodiment, the bonding portion 8311 further comprises a copper layer 8411 embedded in the magnetic recording head 830, a titanium layer or a tantalum layer 8412 formed on the trailing surface 833 of the magnetic recording head 830 and connected to the copper layer 8411, a nickel-iron alloy layer 8413 formed on the titanium layer or the tantalum layer 8412, and a gold layer 8414 formed on the nickel-iron alloy layer 8413. Concretely, two electrically conductive solder nonwettable coats 8312 are formed on the surface of two opposite side portions of the gold layer 8414 respectively.

It should be noted that the position distribution of the electrically conductive solder nonwettable coat can be varied depending on the actual requirement. For example, the bonding pad has a convex portion in the middle thereof for forming a step, the electrically conductive solder nonwettable coat is formed on the step of the bonding pad surrounding the convex portion.

Figure 8:
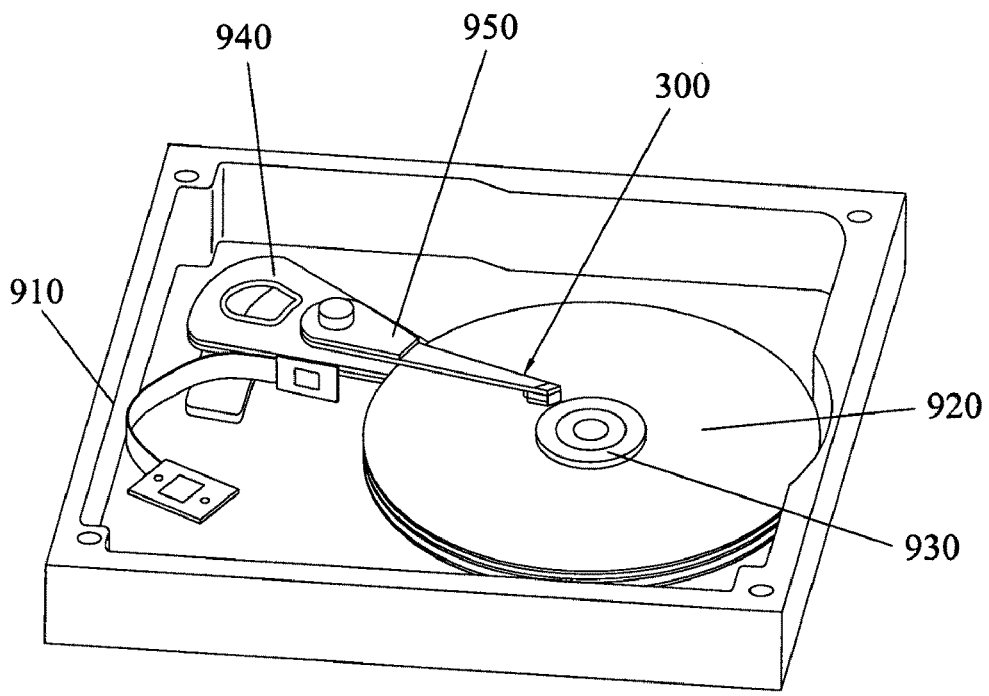
FIG. 8 is a perspective view of a disk drive unit according to the present invention.

Referring to FIG. 8, according to an embodiment of the present invention, a disk drive unit 1000 can be attained by assembling a housing 910, a disk 920, a spindle motor 930 for spinning the disk 920, a voice coil motor 940, the HGA 300 of the present invention, and a drive arm 950 connected to the HGA 300. Because the structure and the assembly process of disk drive unit are well known to persons ordinarily skilled in the art, a detailed description of such structure and assembly is omitted herefrom.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A magnetic recording head, comprising:
   a trailing surface; and
   a plurality of bonding pads arranged on the trailing surface and in a row adapted for both bonding and testing, each of the bonding pads having at least one side portion being coated with electrically conductive solder nonwettable coat to prevent short circuit between the adjacent bonding pads.

2. The magnetic recording head as claimed in claim 1, wherein at least eight bonding pads are formed on the trailing surface of the magnetic recording head.

3. The magnetic recording head as claimed in claim 1, wherein the electrically conductive solder nonwettable coat is made of nickel alloy, titanium alloy, tantalum alloy, aluminum alloy or diamond like carbon.

4. The magnetic recording head as claimed in claim 1, wherein the bonding pad has a convex portion for forming a step, the electrically conductive solder nonwettable coat is formed on the step of the bonding pad.

5. The magnetic recording head as claimed in claim 1, wherein the electrically conductive solder nonwettable coat is formed on the surface of one side portion of the bonding pad.

6. The magnetic recording head as claimed in claim 1, wherein the bonding pad has a convex portion for forming two steps, two electrically conductive solder nonwettable coats are formed on the two steps of the bonding pad respectively.

7. The magnetic recording head as claimed in claim 1, wherein two electrically conductive solder nonwettable coats are formed on the surface of two side portions of the bonding pad.

8. A head gimbal assembly, comprising:
   a magnetic recording head; and
   a suspension having a suspension tongue with electrical pads for mounting the magnetic recording head thereon;
   wherein the magnetic recording head comprising:
   a trailing surface; and
   a plurality of bonding pads arranged on the trailing surface and in a row adapted for both bonding and testing, each of the bonding pads having at least one side portion being coated with electrically conductive solder nonwettable coat to prevent short circuit between the adjacent bonding pads, the bonding pads electrically connecting to the electrical pads formed on the suspension.

9. The head gimbal assembly as claimed in claim 8, wherein at least eight bonding pads are formed on the trailing surface of the magnetic recording head.

10. The head gimbal assembly as claimed in claim 8, wherein the electrically conductive solder nonwettable coat is made of nickel alloy, titanium alloy, tantalum alloy, aluminum alloy or diamond like carbon.

11. The head gimbal assembly as claimed in claim 8, wherein the bonding pad has a convex portion for forming a step, the electrically conductive solder nonwettable coat is formed on the step of the bonding pad.

12. The head gimbal assembly as claimed in claim 8, wherein the electrically conductive solder nonwettable coat is formed on the surface of one side portion of the bonding pad.

13. The head gimbal assembly as claimed in claim 8, wherein the bonding pad has a convex portion for forming two steps, two electrically conductive solder nonwettable coats are formed on the two steps of the bonding pad respectively.

14. The head gimbal assembly as claimed in claim 8, wherein two electrically conductive solder nonwettable coats are formed on the surface of two side portions of the bonding pad.

15. The head gimbal assembly as claimed in claim 8, wherein a plurality of electrical pads are formed on the suspension tongue and bonded to the bonding pads formed on the trailing surface of the magnetic recording head by solder joints.

16. A disk drive unit comprising:
   a head gimbal assembly including a magnetic recording head and a suspension supporting the magnetic recording head;
   a drive arm connected to the head gimbal assembly;
   a disk; and
   a spindle motor operable to spin the disk;
   wherein the magnetic recording head comprising:
   a trailing surface; and
   a plurality of bonding pads arranged on the trailing surface and in a row adapted for both bonding and testing, each of the bonding pad having at least one side portion being coated with electrically conductive solder nonwettable coat to prevent short circuit between the adjacent bonding pads, the bonding pads electrically connecting to electrical pads formed on the suspension.

* * * * *